Figure 3:
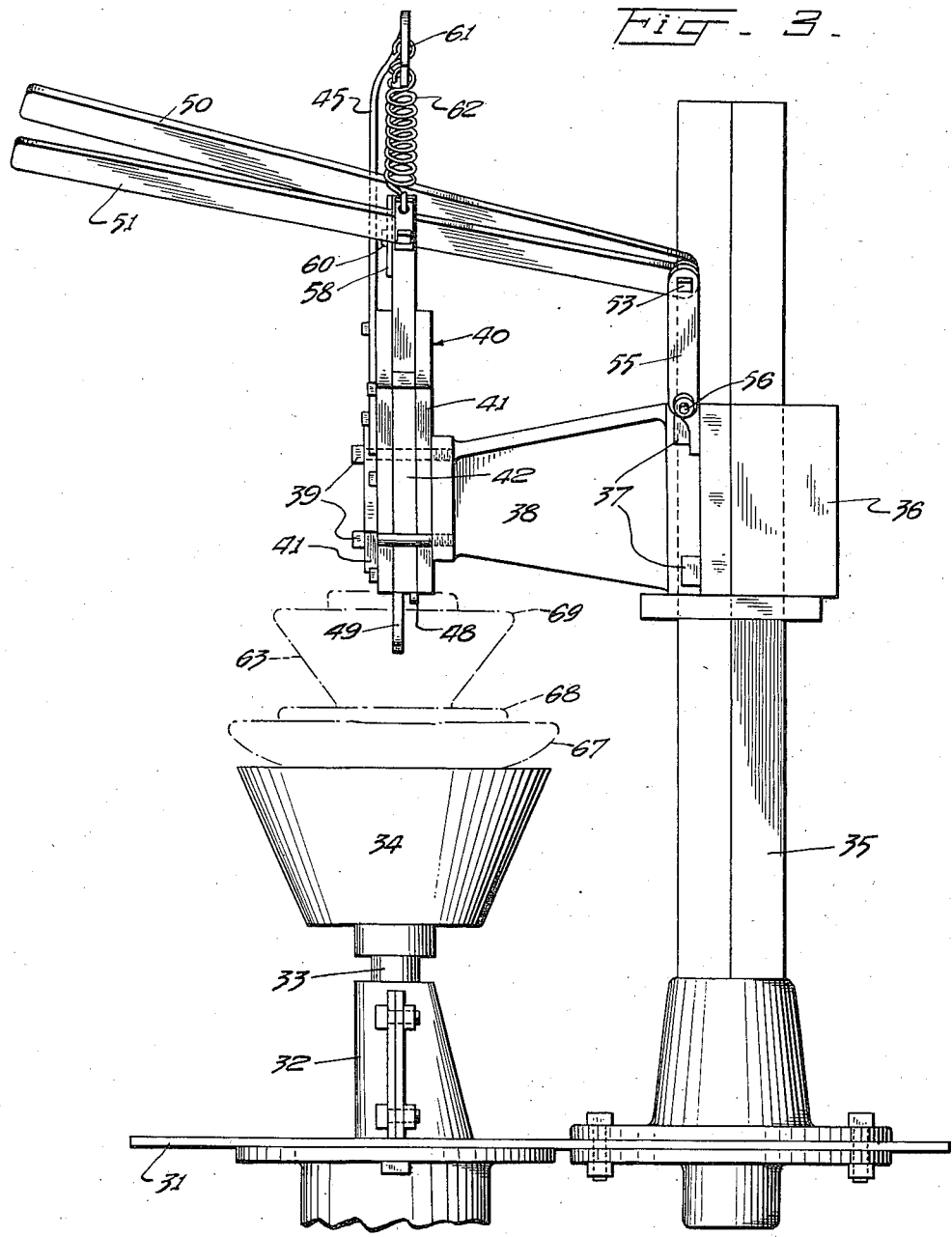

March 24, 1936.  A. G. BENARD  2,034,707
APPARATUS FOR MAKING ONE-PIECE INSULATORS
Filed Oct. 24, 1929   3 Sheets-Sheet 1
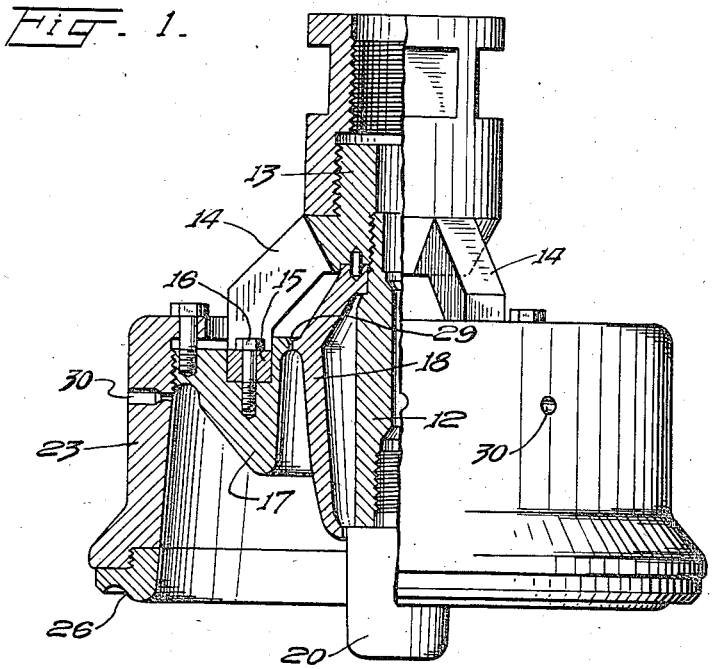
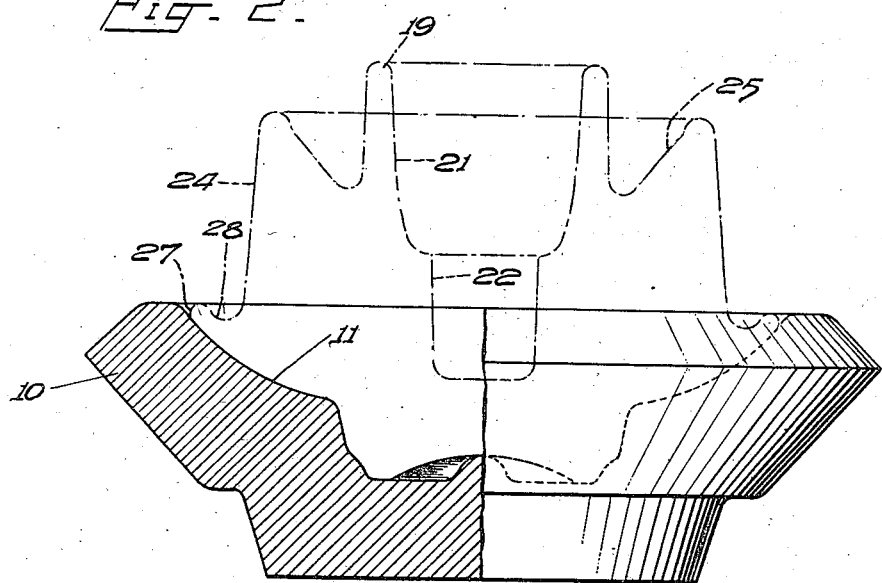
INVENTOR
A. G. BENARD
BY
ATTORNEY March 24, 1936. A. G. BENARD 2,034,707
APPARATUS FOR MAKING ONE-PIECE INSULATORS
Filed Oct. 24, 1929 3 Sheets-Sheet 2

INVENTOR
A. G. BENARD
BY
ATTORNEY

March 24, 1936.  A. G. BENARD  2,034,707
APPARATUS FOR MAKING ONE-PIECE INSULATORS
Filed Oct. 24, 1929   3 Sheets-Sheet 3
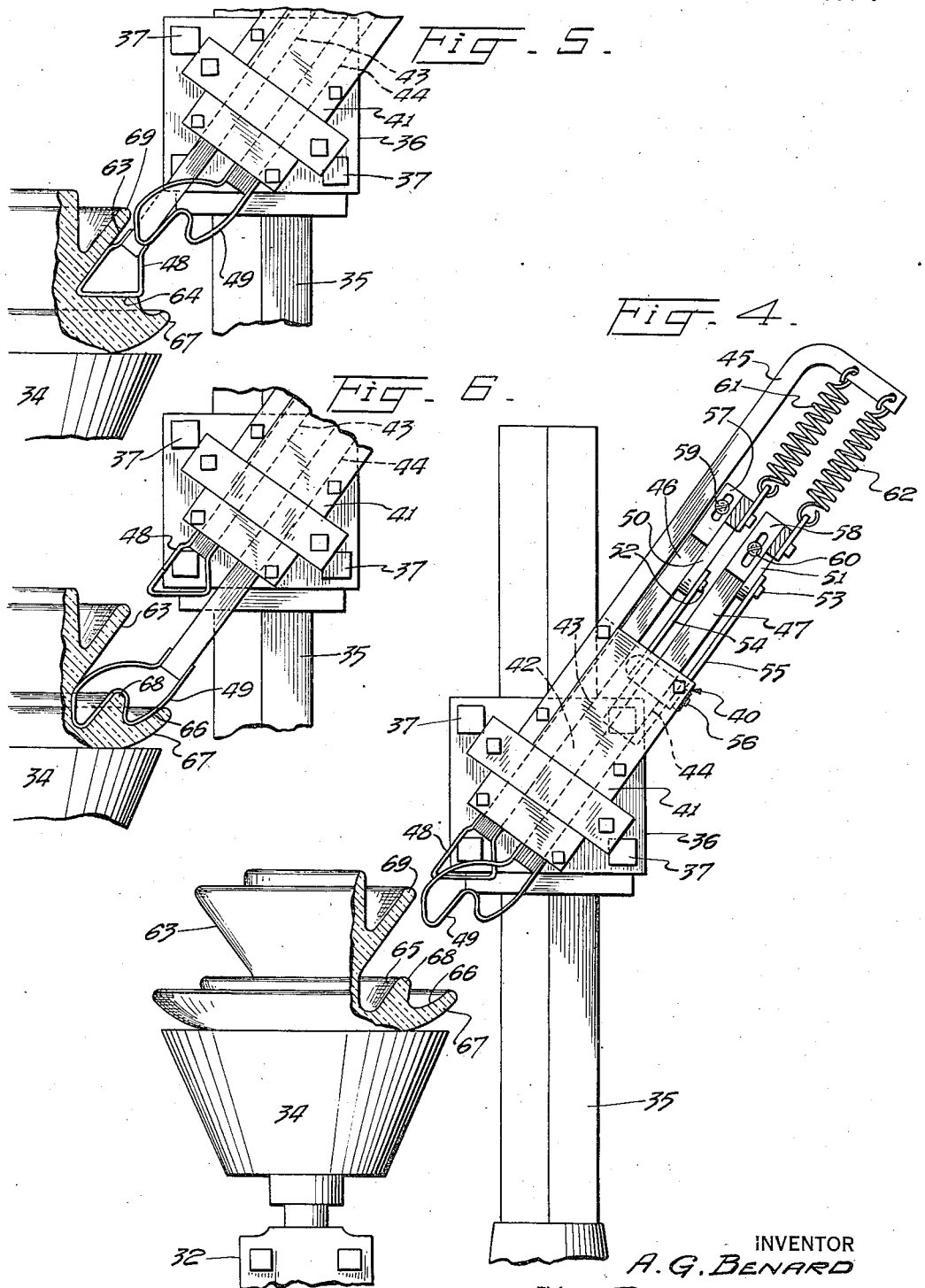
INVENTOR
A. G. BENARD
BY
ATTORNEY Patented Mar. 24, 1936

2,034,707

UNITED STATES PATENT OFFICE 2,034,707

APPARATUS FOR MAKING ONE-PIECE INSULATORS

Arthur G. Benard, Victor, N. Y., assignor to Locke Insulator Corporation, Baltimore, Md., a corporation of Maryland Application October 24, 1929, Serial No. 402,208

2 Claims. (Cl. 25—3)

The invention relates to the manufacture of porcelain insulators and has for its general object the provision of a novel method and apparatus for the purpose.

It is well known that where extremely large insulators are necessary for the support of conductors carrying high tension transmission lines it is customary to build up insulators from a plurality of parts or sections which are secured together in nested relation. Naturally there are numerous difficulties encountered in the assembly of insulators of this type for the reason that the individual sections or units sometimes shrink or become otherwise distorted during drying or firing with the result that it is often difficult and sometimes impossible to nest the sections properly, it being consequently an obvious loss caused by discarding certain defective units. Furthermore there is considerable labor involved in assembling the parts and introducing the cement necessary for securing them together.

It is with the above facts in view that I have devised the present invention which has for its main object the provision of a novel method and apparatus whereby insulators having the appearance and size of built up multi-part insulators may be formed in one piece, thereby reducing the number of operations necessary and consequently the cost of manufacture.

A more specific object of the invention is to provide a method of making insulators involving initially plunging a mass or billet of clay to give it, partially, the desired contour and then cutting away a portion of the material to complete the shaping of the undersides of the skirts or petticoats.

Another important object of the invention is to provide a novel apparatus or machine by means of which this turning or cutting may be expeditiously effected with precision so that any desired number of insulators having exactly the same configuration may be turned out or produced, it being naturally advantageous that there be no noticeable variations, that is to say any other than what would naturally occur in the carrying out of any manufacturing process.

A more specific object of the invention is to provide an apparatus or machine embodying a novel construction of, mounting for and operating means for movable cutters adapted to be brought successively into engagement with the plunged and partially shaped body while the latter is rotated.

An additional object is to provide an apparatus for this purpose which will be simple and inexpensive to make, easy to use, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a view partly in elevation and partly in section showing a plunging die for partially shaping a mass or billet of clay, Figure 2 is a view partly in elevation and partly in section of a mold supporting the billet during the plunging operation, Figure 3 is a side elevation of a machine constructed in accordance with my invention for cutting a partially shaped body to give it the final form, Figure 4 is a fragmentary elevation thereof taken at right angles to Figure 3 and with parts broken away and in section, Figure 5 is a fragmentary elevation with a portion of the clay body in section and showing the action of one cutter, and Figure 6 is a similar view showing the action of the other cutter.

In carrying out the invention, I first take a mass or billet of suitably preliminarily treated clay and place it within a mold 10 which may be of the type commonly used in the plunging operation for making various types of insulators. This mold may be of any suitable material and is formed with a cavity 11 of such shape that when the clay body or mass is compressed against it it will give the desired configuration for the top of the insulator. In conjunction with this mold 10 I make use of a die shown in detail in Figure 1, which die is here represented as comprising a central member 12 to which is secured the hub portion 13 of a spider 14 the arms of which carry a ring 15 detachably connected, as by bolts or studs 16, to a ring shaped member 17. Surrounding the central member 12 is a preferably tapered shell member 18. The exterior wall of the shell member 18 and the inner wall of the ring 17 are such that when the clay mass is plunged they will form a petticoat 19 while the shell 18 and end 20 of the central member 12 will define a cavity 21 and recess 22, respectively, in the clay body, the recess 22 being for the accommodation of the pin or post commonly used in connection with pedestal or other types of insulators. Secured to and surrounding the ring 17 is an outer shell member 23 which, in conjunction with the ring 17, will form or shape a relatively thick intermediate portion 24 on the clay body, the underside of the ring 17 depressing the clay and defining an annular recess 25 surrounding the skirt 19. The shell member 23 is here represented as equipped at its open end or bottom with an additional detachable ring 26 intended to cooperate with the edge of the cavity in the mold 10 for defining the outermost skirt 27 which is spaced from the thick intermediate portion 24 by an annular recess 28, the shape of which will depend on the exact curvature of the underside of the ring 26. To avoid entrapment of air in the space between the shell 18 and the ring 17 and between the ring 17 and the shell 23 as the clay is plunged, it is preferable to provide two series of openings 29 and 30 located respectively at the juncture of the ring 17 with the shell 18 and within the shell 23 adjacent its connection with the ring 17.

The operation to this point comprises placing a billet or mass of clay in the mold 10 and then subjecting it to pressure by means of the die shown in Figure 1. In machines for this purpose, that is to say machines which are commonly known as plunging machines the die is carried by a vertically movable and simultaneously rotatable shaft and the mold carrying the billet of clay is placed within a centering or guide device beneath and in the path of movement of the vertically movable and rotatable die so that when the latter is brought downwardly it will engage the billet of clay with direct pressure accompanied by rotation, the result being that the billet of clay will be pressed into the desired shape which in the present instance may be that illustrated by the dot and dash lines in Figure 2 and also indicated, after it is subsequently treated, by full lines in Figures 3, 4, 5, and 6. Reverting to Figure 1 it should of course be understood that the size and shape of the members 17, 18, 23, and 26 will necessarily depend upon the type, shape and character of the insulator to be made and it will be noted that in actual practice there would very likely be provided a plurality of such members of different sizes and shapes and intended to be interchangeably used to meet the requirements of any given lot of insulators.

The invention further contemplates the final shaping of the partially formed body, plunged as above described, by cutting away certain portions beneath the skirts or petticoats so that the proper configuration will be attained, this cutting being done while the partially shaped mass or body is rotated. In some instances this cutting may not be done at once but may be postponed for a short time to permit the clay body to harden slightly, at least sufficiently that it may be lifted out of the mold 10 and placed in a suitable holder for subsequent treatment without any danger of distortion during handling.

In order that the cutting of the clay body to effect shaping may be carried out readily and accurately, I have devised the machine shown in Figures 3 to 6 inclusive though it is conceivable that there might be some variation in the structure thereof without departing from the spirit of the invention. Referring to these figures the numeral 31 designates a base or table associated with a bearing 32 through which is journaled a shaft 33 carrying a cup-like support 34 adapted to support the previously plunged body in inverted position. Any means may be provided for rotating this shaft 33 but no detail is illustrated as it is obvious how it may be done. Suitably secured to and rising from the base or table 31 is a post or standard 35 spaced from the bearing 32 and carrying a preferably vertically adjustably mounted carriage 36 which may be held in any desired position along the post or standard as by bolts 37. Projecting laterally from the carriage 36 is an arm 38 on the end of which is suitably secured, as by bolts 39, a frame indicated generally by the numeral 40, the details of which are not of prime importance. However, this frame is represented as including plates 41 between which may be arranged any desired fillers or strips 42 defining spaced parallel guide grooves 43 and 44. This frame 40 also carries an upwardly extending arm 45 for a purpose to be described.

Slidable along the respective guide grooves 43 and 44 are bars 46 and 47 provided at their lower ends with cutters 48 and 49 which, as is well known, are usually formed as relatively thin strips of metal bent into the desired shape with their ends secured to whatever support is provided for them, in the present instance the bars 46 and 47. These cutters are adapted to be brought into engagement with the clay body while the same is rotated and will cut away the material, which is still somewhat plastic, and give the desired shape to the exterior. In order that these cutters may be moved, I provide levers 50 and 51 pivoted at 52 and 53 upon links 54 and 55 which are in turn pivoted at 56 upon the carriage 36. Secured to these levers are brackets 57 and 58 longitudinally slotted as shown for the passage of screws 59 and 60, or their equivalent, which screws engage within or through the respective bars 46 and 47. The purpose of these bolts or screws and the slots is to permit adjustment of the bars so that the depth of the cuts made by the cutters 48 and 49 may be regulated. Coil springs 61 and 62 are connected with the respective levers and with the laterally deflected upper end of the arm 45 so that the levers and consequently the cutters will be held in elevated or retracted position out of engagement with the plunged clay body to be treated or worked upon.

Assuming that the clay piece has been initially formed and partially shaped by the plunging step so that it will have the contour defined by the dot and dash lines in Figure 2, the piece is placed upon the rotatable holder 34 of the machine shown in Figure 3, the levers 50 and 51 being at this time in their elevated or ineffective positions with the cutters 48 and 49 out of contact with the clay piece. The holder 34 carrying the clay piece is then rotated while the operator pulls downwardly gradually upon the lever 50 whereupon the bar 46 will be slid downwardly along its guide in the frame 40, of course carrying with it the cutter 48 which will thus be brought into cutting engagement with the clay piece, as shown in Figure 5, the outer wall of the relatively thick intermediate portion 24 of the piece being cut away so that the top portion of the piece will overhang the intermediate and lower portions. After the maximum extent of cutting has been brought about by this cutter the lever 50 is returned to its upper position and the lever 51 is brought upward gradually so as to move the bar 47 downwardly and engage the cutter 49 with the insulator. The cutter 48 above described defines an inclined wall 63 on the side of the piece and a horizontal shoulder 64. The wall 63 is unaffected by the action of the cutter 49 which works upon the shoulder 64, as shown in Figure 6, digging out concentric annular channels or grooves 65 and 66 defining the outermost skirt 67 and a petticoat 68. The groove 25 formed in the plunging step together with the cutting away of the body by the tool 48 to form the inclined wall 63 defines a lower petticoat 69. After cutting in this manner the clay piece may be sponged and set away to dry after which it will of course be glazed and fired.

From the foregoing description and a study of the drawings it will be apparent that I have thus provided a very simple method and means for forming in one piece porcelain insulators of the type commonly built up from a number of units or shells nested and secured together. The peculiar mounting and arrangement of the cutting means are such that the clay piece may be undercut wherever desired. Manifestly it would be impossible to form such an insulator entirely by plunging owing to the overhang of different parts. To make an insulator of this character by a casting method is not particularly successful on account of uneven drying of the material. My above described method and apparatus therefore makes it possible to accomplish the manufacture of one-piece insulators of any size in an expeditious and accurate manner. It is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. An apparatus for shaping porcelain insulators while in plastic condition, comprising a supporting structure including a rotatable platform for supporting the material worked upon and further including an upright, a carriage vertically slidably mounted upon said upright in spaced relation to said platform, bolt means forming part of the carriage for securing it in selected adjusted position, said carriage having spaced parallel elongated guides extending at an acute angle with respect to the upright and the axis of the piece worked upon, a pair of elongated members slidably mounted within the respective guides, cutters on the lower ends of said members, upstanding links pivotally mounted at their lower ends upon said carriage, levers pivotally connected with the upper ends of the respective links and pivotally connected with the respective elongated members, said carriage including an angular element extending above the levers, and springs connected with the upper end of said angular element and with said levers for normally maintaining the latter in elevated position with the elongated members retracted.

2. A device for shaping insulators in plastic condition, comprising a supporting structure including a rotary platform for supporting the insulator and further including an upright, a carriage vertically slidably mounted upon said upright, bolt means for maintaining the carriage in a selected position, a horizontal arm projecting from said carriage, a frame mounted on the end of said arm and including plates with interposed fillers spaced apart to define guides inclined at an acute angle with respect to the axis of rotation of the insulator, elongated members slidably mounted within the respective guides and equipped at their lower ends with cutters, upstanding links pivoted upon the carriage, levers pivoted to the upper ends of the respective links, brackets secured to said levers and slidably adjustably connected with said elongated members, an angular element forming part of said frame and extending above the levers, and coil springs connected with the upper end of said angular element and with the levers for urging the elongated members into retracted position.

ARTHUR G. BENARD.